US010454947B2

(12) United States Patent
Rodgers et al.

(10) Patent No.: US 10,454,947 B2
(45) Date of Patent: Oct. 22, 2019

(54) MECHANISM FOR MONITORING DATA USING WATCHLIST ITEMS

(71) Applicant: Oracle International Corporation, Redwood Shores, CA (US)

(72) Inventors: Michael Patrick Rodgers, Orange, CA (US); Christopher Lee Walsh, Centennial, CO (US)

(73) Assignee: Oracle International Corporation, Redwood Shores, CA (US)

( * ) Notice: Subject to any disclaimer, the term of this patent is extended or adjusted under 35 U.S.C. 154(b) by 956 days.

(21) Appl. No.: 14/247,810

(22) Filed: Apr. 8, 2014

(65) Prior Publication Data

US 2014/0304811 A1 Oct. 9, 2014

Related U.S. Application Data

(60) Provisional application No. 61/809,765, filed on Apr. 8, 2013.

(51) Int. Cl.
*H01L 29/06* (2006.01)
*H04L 29/06* (2006.01)

(52) U.S. Cl.
CPC .................. *H04L 63/1408* (2013.01)

(58) Field of Classification Search
CPC ..... H04L 63/1408; H04L 63/14; G06F 21/57; G06F 2221/034; G06F 21/50
See application file for complete search history.

(56) References Cited

U.S. PATENT DOCUMENTS

| | | | | |
|---|---|---|---|---|
| 6,470,387 | B1* | 10/2002 | Fischer | H04L 29/06 709/224 |
| 8,838,834 | B2* | 9/2014 | Reynolds | G06Q 10/10 709/224 |
| 8,893,300 | B2* | 11/2014 | Ramachandran | H04L 63/105 707/687 |
| 2005/0198535 | A1* | 9/2005 | Basche | H04L 63/1408 726/5 |
| 2005/0265083 | A1 | 12/2005 | Perry | |
| 2007/0106892 | A1* | 5/2007 | Engberg | G06Q 20/02 713/168 |
| 2008/0140587 | A1* | 6/2008 | Corning | G06Q 20/108 705/36 R |
| 2009/0204517 | A1 | 8/2009 | Edens | |
| 2010/0023999 | A1* | 1/2010 | Schran | G06F 21/6263 726/1 |
| 2010/0125665 | A1* | 5/2010 | Simpson | G06F 11/3409 709/224 |
| 2011/0142237 | A1* | 6/2011 | Iasso | G06F 21/552 380/259 |

(Continued)

OTHER PUBLICATIONS

Non-final Office Action dated Sep. 9, 2016 for related U.S. Appl. No. 14/188,341, 16 pages.

(Continued)

*Primary Examiner* — Yonas A Bayou
(74) *Attorney, Agent, or Firm* — Vista IP Law Group, LLP

(57) ABSTRACT

Embodiments of the present invention provide a mechanism for monitoring data using a watchlist item and a watchlist item definition that includes a set of parameters for identifying a set of data items for user action and criteria for recommending or requiring user action for the set of data items to be identified.

27 Claims, 10 Drawing Sheets

(56) References Cited

U.S. PATENT DOCUMENTS

| | | | |
|---|---|---|---|
| 2011/0307366 A1 | 12/2011 | Ahuja | |
| 2012/0137375 A1* | 5/2012 | Ramachandran ... | G06F 21/6218 |
| | | | 726/28 |
| 2012/0306908 A1 | 12/2012 | Wood | |
| 2013/0151305 A1 | 6/2013 | Akinola | |
| 2013/0160129 A1* | 6/2013 | Sartin ................... | G06F 21/552 |
| | | | 726/25 |
| 2014/0053265 A1* | 2/2014 | Crowley ................ | H04L 43/12 |
| | | | 726/22 |
| 2014/0157407 A1* | 6/2014 | Krishnan ................ | G06F 21/50 |
| | | | 726/22 |
| 2015/0088578 A1 | 3/2015 | Nowakowski et al. | |

OTHER PUBLICATIONS

Final Office Action dated Apr. 3, 2017 for related U.S. Appl. No. 14/188,341.
Non-final Office Action dated Oct. 31, 2017 for related U.S. Appl. No. 14/188,341.

* cited by examiner

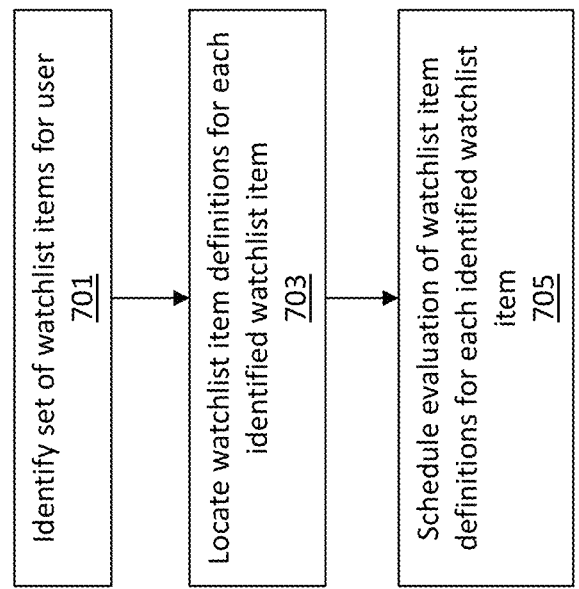

MECHANISM FOR MONITORING DATA USING WATCHLIST ITEMS

CROSS REFERENCE TO RELATED APPLICATIONS

The present application claims the benefit of priority to U.S. Provisional Application No. 61/809,765, entitled "MECHANISM FOR MONITORING DATA USING WATCHLIST ITEMS" filed on Apr. 8, 2013, which is hereby incorporated by reference in its entirety.

The present application is related to application Ser. No. 14/188,341, filed on Feb. 24, 2014, entitled "PROJECT MANAGEMENT ALERTS USING HETEROGENOEOUS PROJECT DATA", which is hereby incorporated by reference in its entirety.

FIELD

This disclosure concerns data monitoring, and in particular to a mechanism for monitoring data using watchlist items.

BACKGROUND

Users of Enterprise Resource Planning (ERP) Software have a frequent need for identifying various sets of data items that require user actions. Conventionally, for a user to identify a set of data items that require user actions, the user must perform an active step of checking a database of records to identify the set of data items that may require user action and then determining whether user actions are to be performed on the data. This can become quite time consuming when several sets of data items are to be identified that require user actions. Additionally, when data items are manually identified by a user, there is an increased risk that certain data items that require user action may be overlooked.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIG. 7 is a flow diagram illustrating a method for evaluating watchlist items for a user according to some embodiments of the invention.

SUMMARY OF THE INVENTION

Embodiments of the present invention provide a mechanism for monitoring data using watchlist items.

Further details of aspects, objects and advantages of the invention are described below in the detailed description, drawings and claims. Both the foregoing general description and the following detailed description are exemplary and explanatory and are not intended to be limiting as to the scope of the invention.

DETAILED DESCRIPTION OF THE EMBODIMENTS OF THE INVENTION

Users of Enterprise Resource Planning (ERP) Software have a frequent need for identifying various sets of data items that require user actions. Conventionally, for a user to identify a set of data items that require user actions, the user must perform an active step of checking a database of records to identify the set of data items that may require user action and then determining whether user actions are to be performed on the data. This can become quite time consuming when several sets of data items are to be identified that require user actions. Additionally, when data items are manually identified by a user, there is an increased risk that certain data items that require user action may be overlooked.

Rather than having a user actively identify data items that may require user action and then determine whether those user actions should be performed, a watchlist may be implemented to proactively present the user with an indication that a collection of data items may require user action as well as alerts indicating when user actions should or need to be taken.

A watchlist is a user interface element used to describe a set of one or more watchlist items. A watchlist item is a user interface element presented to a user that provides an indication of a set of data items identified that may require user action as well as an alert indicating when user actions should or need to be taken. Each watchlist item is associated with a watchlist item definition that is utilized to proactively present the user with an indication of a set of identified data items that may require user action as well as alerts indicating when user actions should or need to be taken. A watchlist item definition is a data object that defines parameters for identifying a set of data items to be monitored as well as a set of criteria that is used to determine when a user should be notified that user actions should or need to be taken for the set of identified data items.

By utilizing a watchlist item definition to proactively present the user (via a watchlist item and watchlist) with an indication of a set of identified data items that may require user action as well as alerts indicating when user actions should or need to be taken, the user no longer has to actively identify sets of data items that may require user action and then determine whether user actions need to be performed for those data items.

Figure 1:
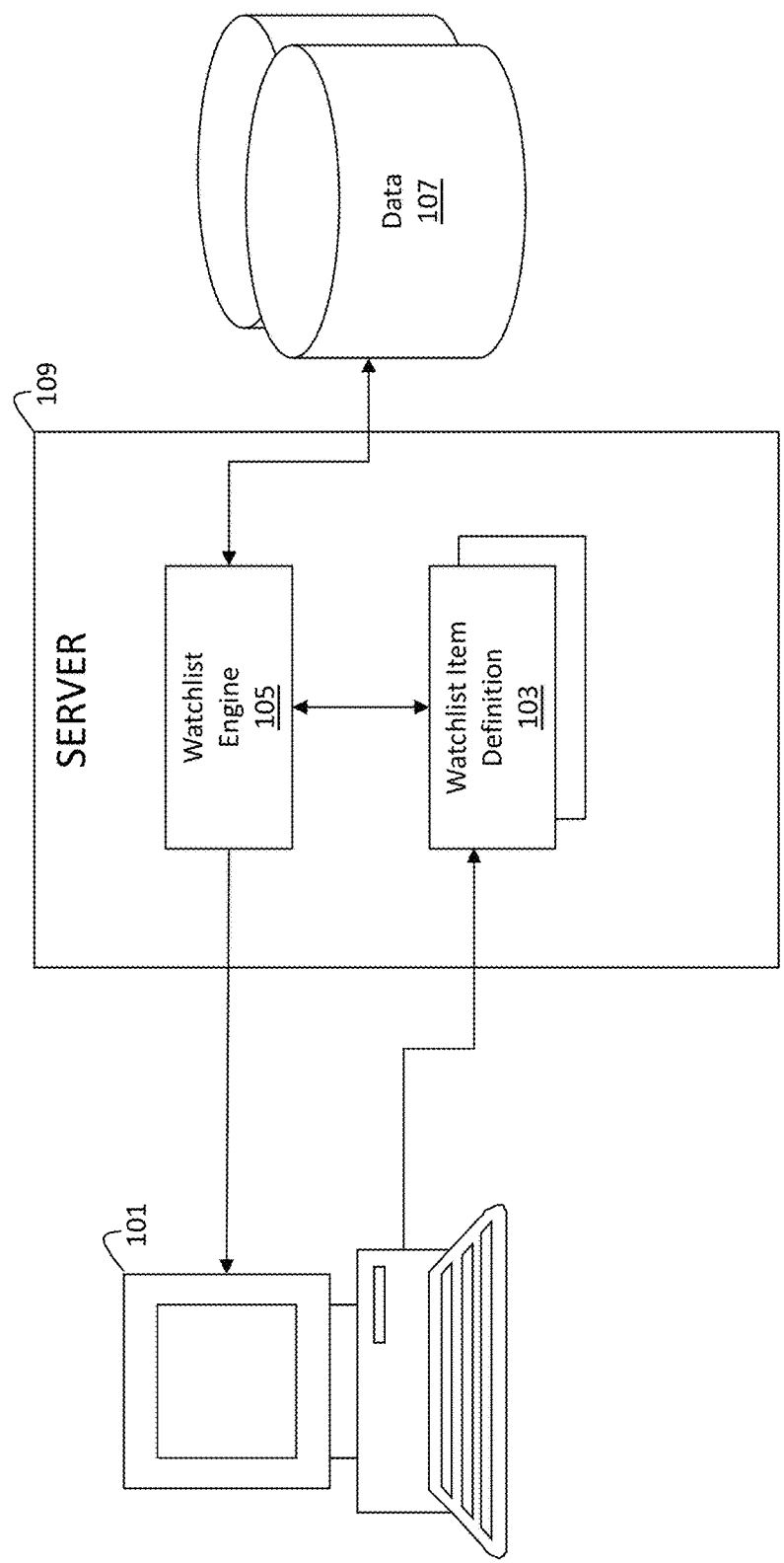
FIG. 1 is a schematic diagram illustrating a system for implementing a watchlist item according to some embodiments of the invention.

FIG. 1 is schematic diagram illustrating a system for utilizing watchlist item definitions in accordance with some embodiments of the claimed invention. A user of a client device 101 (e.g., computer) communicates with a server 109, which in turn communicates with a database 107 having data items. The server 109 includes a watchlist engine 105 and a watchlist item definition 103 created by the user. The watchlist engine 105 utilizes the watchlist item definition 103 to identify a set of data items to be monitored and also to proactively notify the user that the set of data items being monitored may require user action by presenting alerts indicating when user actions should or need to be taken on the client device 101. An indication of the set of data items that may require user action as well as alerts indicating when user actions should or need to be taken are presented to a user by way of a watchlist interface element and watchlist item interface element, which will be described in greater detail below.

While multiple databases 107 are shown in FIG. 1, it is important to note that the data items may be stored on a single database or stored across a plurality of databases.

In order to prevent the user from having to actively identify sets of data items that may require user action and then determine whether those user actions should be performed, a watchlist item definition 103 is first created by the user and stored at the server 109. The watchlist item definition 103 defines parameters for identifying the set of data items to be monitored as well as a set of criteria that is used to determine when a user should be notified that user action should or need to be taken for the set of identified data items.

For example, the watchlist item definition 103 may indicate that a set of defective inventory items of the database 107 are to be identified for monitoring and also define a threshold for how many defective inventory items may be allowed before a user is notified that user action should or needs to be taken on the set of inventory items. In some embodiments, the user may create various different watchlist item definitions 103 in order to monitor various sets of data items for various criteria. Additionally, users may share watchlist items amongst each other.

A watchlist engine 105 located at the server 109 and in communication with the database 107 utilizes the watchlist item definition 103 to identify the set of data items in the database 107 that are to be monitored and that may require user action. In identifying the set of data items that may require user action, the watchlist engine 103 may utilize the existing framework for the database 107. For example, the existing framework may allow for queries to be made to identify the set of data items that may require user action. The watchlist definition may include a set of query parameters to be performed against the database 107 for identifying a set of data that is to be monitored for potential user action. The watchlist engine 105 may perform a query on the database 107 using the query parameters defined in the watchlist item definition for identifying the set of data items to be monitored for potential user actions using the watchlist item definition 103. The watchlist engine 105 may then compare the set of data items identified by the query against a set of criteria for determining whether or not user action may be required on the identified set of data items.

The watchlist engine 105 may periodically re-evaluate the watchlist item definition 103 to identify the set of data items that may require user action, as the set of data items that may require user action may change over time. For example, the number of defective inventory items may increase over time as more inventory items are entered into the database 107. In some embodiments, the watchlist engine 105 re-evaluates the watchlist item definition 103 upon user request. In other embodiments, the watchlist engine 105 re-evaluates the watchlist item definition 10 at set intervals. It is important to note that the watchlist engine 105 may be configured to re-evaluate the watchlist item definition 103 at various times depending on the particular application. It is also important to note that the re-evaluation period for a watchlist item definition may be defined within the watchlist definition itself, which will be described in additional detail below.

Once the watchlist engine 105 has identified the set of data items to be monitored and compared the set of data items against the set of criteria for determining whether or not user action may be required, a watchlist item interface element (not shown) may be presented to the user that indicates the set of data items that are being monitored. Additionally, the watchlist engine 105 may compare the set of identified data items against the criteria defined by the watchlist item definition 103 to provide alerts indicating when user actions should or need to be taken on the client device 101 through the watchlist item interface element. In comparing the set of data items that may require user action against the criteria defined by the watchlist item definition 103, the watchlist engine 105 may utilize the existing framework for the database 107. For example, the database 107 may have a monitoring framework whereby data items in the database 107 are actively monitored. The watchlist engine 105 may utilize the existing monitoring framework to facilitate in comparing the identified set of data items against the criteria defined by the watchlist item definition 103.

If the set of data items meets the criteria defined by the watchlist item definition 103, an alert recommending or requiring user performance of a user action is provided to the user at the client device 101 through the watchlist item interface element. If however, the set of data items does not meet the criteria, no alert is provided to the user at the client device 101. In some embodiments, the watchlist item interface element may be hidden when the set of data items does not meet the criteria.

In some embodiments, the watchlist engine 105 provides the user with a first alert upon the set of data items meeting a first criterion and a second alert upon the set of data items meeting a second criterion. For example, the watchlist engine 105 may issue a warning alert to the user for performing user action when it is determined that the set of inventory items having defects meets a warning threshold and may issue a critical alert to the user for performing user action when it is determined that the set of inventory items having defects meets a critical threshold.

Thus, rather than having a user actively identify and monitor data items that may require user action and then determine whether those user actions should be performed, the watchlist engine 105 in conjunction with the watchlist item definition 103 proactively presents the user with an indication of a collection of items that may require user action and additionally provides the user with an alert indicating whether user action should or need to be taken through a watchlist interface element and watchlist item interface element.

Figure 2:
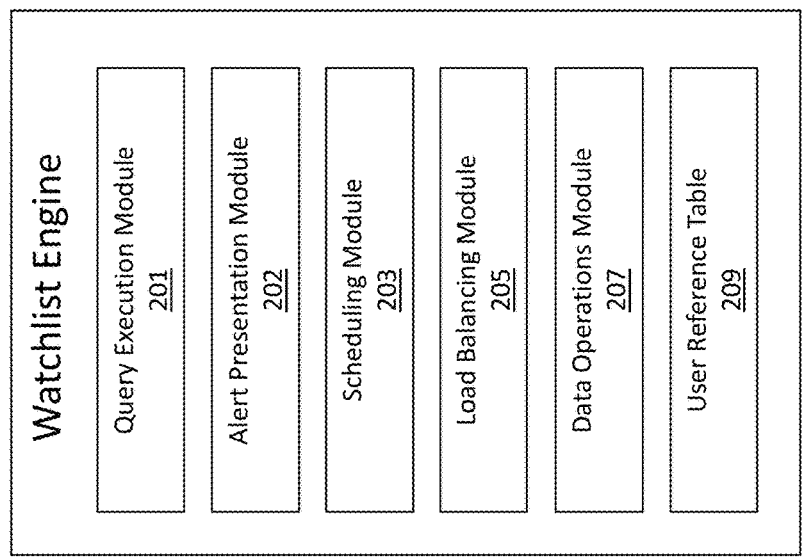
FIG. 2 is a schematic diagram illustrating an example watchlist engine according to some embodiments of the invention.

The watchlist engine may be implemented using various modules. FIG. 2 is a schematic diagram illustrating an example watchlist engine according to some embodiments of the invention. The watchlist engine in FIG. 2 includes a query execution module 201, an alert presentation module 202, a scheduling module 203, a load balancing module 205, a data operations module 207, and a user reference table 209.

The query execution module 201 may be utilized to perform a query on data stored within the database to identify a set of data items to be monitored. The query execution module 201 may locate the set of query parameters defined in a watchlist item definition and perform a query on data stored in the database to identify a set of data items to be monitored. For example, the query parameters may indicate that data within the database is to be searched to identify all defective inventory items as of the time of the query. The query execution module 201 would then perform a query on the data stored in the database to identify all defective inventory items in the database at the time of the query.

An alert presentation module 202 may then be utilized to determine whether an alert is to be presented to the user for indicating that the identified set of data items to be monitored may require user action. The alert presentation module 202 may compare the identified set of data items against the set of criteria defined by the watchlist item definition to determine whether an alert for user action needs to be presented. For example, where the set of criteria indicates that user action may be required where the number of defective inventory items exceeds 100, the alert presentation module would determine whether the number of defective inventory items identified by the query exceeds 100 and present an alert to the user where the number of defective inventory items exceeds 100.

Because the watchlist engine may be responsible for monitoring several different watchlists at any given time, a scheduling module 203 may be utilized to schedule when the various watchlist item definitions are to be evaluated. For example, different watchlist item definitions may have different priorities, and so the scheduler may schedule evaluation of watchlist item definitions based on priority.

Similarly, because the watchlist engine may have a limited amount of resources, a load balancing module 205 may be utilized to balance the load of evaluating different watchlist item definitions against the system set of resources. For example, if the system includes several processing threads, the load balancing module 205 may identify which threads may are responsible of evaluating which watchlist item definitions based on resource utilization.

The watchlist engine may also include a data operations module 207 for performing certain operations on the identified set of data to be monitored. Certain operations may be performed on the identified set of data items to be monitored for identifying certain characteristics associated with the identified set of data items. Such operations may include an aggregation operation for aggregating certain values associated with the set of data items, an averaging operation for averaging certain values associated with the set of data items. For example, where the set of identified data items to be monitored includes the number of defective inventory items at the time of the query, an aggregation operation may be used to identify the total value of the set of defective inventory items or an averaging operation may be used to identify the average value of the set of defective inventory items.

The watchlist engine may further include a user reference table 209 for determining which watchlist items are associated with which users. For each watchlist item definition, the user reference table 209 may include an indication of which user created the watchlist item definition and also which users the watchlist item definition should be shared with.

Figure 3:
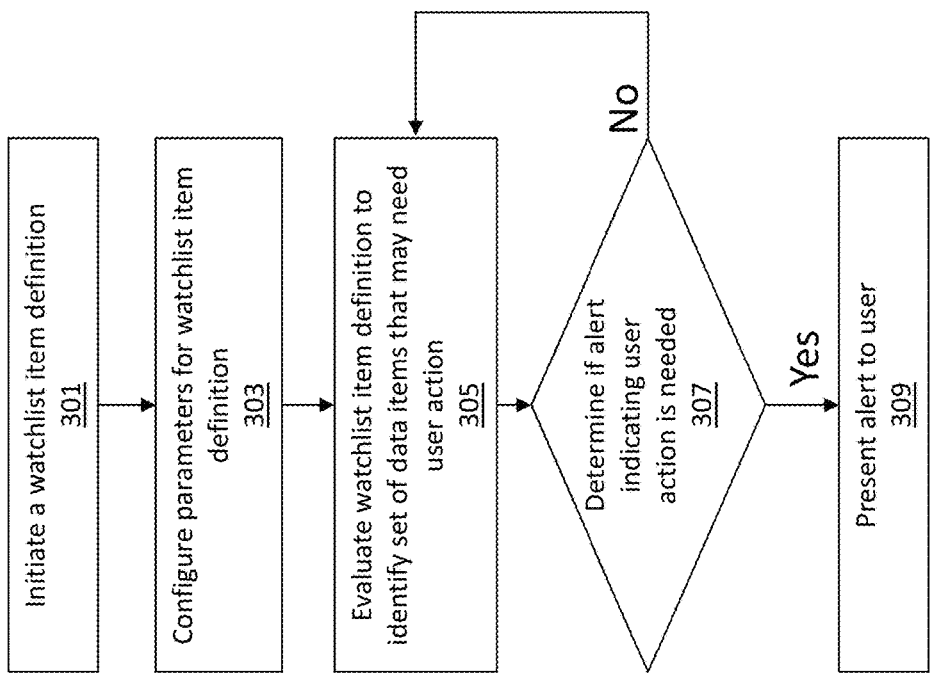
FIG. 3 is a flow diagram illustrating a method for implementing a watchlist item definition according to some embodiments of the invention.

FIG. 3 is a flow diagram illustrating a method for implementing a watchlist item definition according to some embodiments of the invention. Initially, a user initiates a watch list item definition as shown at 301. For example, the user may be presented with an interface having a watchlist item initiation icon that may be selected for initiating a watchlist item definition. Examples of a user interface for implementing and utilizing watchlist item definitions will be discussed in greater detail below.

The user then configures parameters for the watchlist item definition as shown at 303. As discussed above, the user may define query parameters for identifying the set of data items to be monitored for user action as well as a set of criteria that is used to determine when a user should be notified that user action should or needs to be taken for the set of identified data items.

Figure 4:
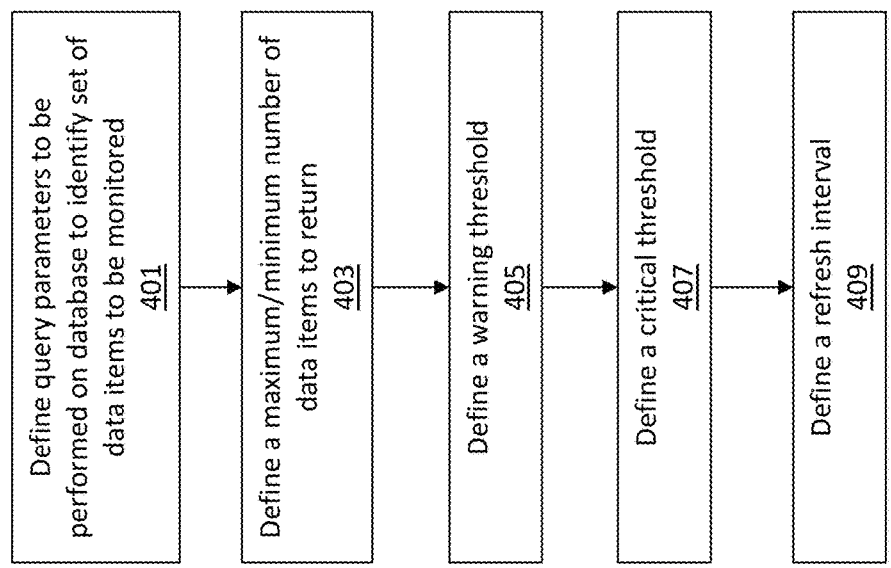
FIG. 4 is a flow diagram illustrating an example method for configuring parameters for the watchlist item definition according to some embodiments of the invention.

FIG. 4 is a flow diagram illustrating an example method for configuring parameters for the watchlist item definition according to some embodiments of the invention. Initially, the user may define query parameters to be performed on a database to identify a set of data items to be monitored as shown at 401. For example, the user may provide query parameters for identifying the set of defective inventory items at the time of the query.

The user may optionally set a maximum/minimum number of data items to return as shown at 403. For example, the user may set a maximum set of data items at 100 for a query directed at identifying a set of defective data items because any number of defective inventory items greater than 100 will require the user to perform a set of actions on the set of data items and there is no need to utilize additional system resources to identify more than 100 defective inventory items.

The user may then define a warning threshold as shown at 405. The warning threshold may be a low warning threshold or a high warning threshold. Where the warning threshold is a low warning threshold, if the number of data items to be monitored meets or falls below the low warning threshold, then a warning alert will be presented to the user, as will be discussed in additional detail below. Where the warning threshold is a high warning threshold, if the number of data items to be monitored meets or exceeds the high warning threshold, then a warning alert will be presented to the user, as will be discussed in additional detail below.

As an example, where the warning threshold is a high warning threshold and is set at 50, if the set of defective inventory items meets or exceeds 50, then a warning alert will be presented to the user recommending the user to take action on the set of defective inventory items.

After defining a warning threshold, the user may optionally define a critical threshold as shown at 407. Again, the critical threshold may be a high critical threshold or a low critical threshold. Where the critical threshold is a low critical threshold, if the number of data items to be monitored meets or falls below the low critical threshold, then a warning alert will be presented to the user, as will be discussed in additional detail below. Where the critical threshold is a high critical threshold, if the number of data items to be monitored meets or exceeds the high critical threshold, then a critical alert will be presented to the user, as will be discussed in additional detail below.

As an example, where the critical threshold is a high warning threshold and is set at 75, if the set of defective inventory items meets or exceeds 75, then a critical alert will be presented to the user recommending the user to take action on the set of defective inventory items.

The user may also optionally define a refresh interval as shown at 409. The refresh interval indicates how often the watchlist item definition is re-evaluated. Depending on the nature of the data to be monitored, the refresh interval may be set to a very short period of time or a much longer period of time.

FIG. 4 has been described using the situation where the number of data items identified by the query parameters is compared to the warning threshold or critical threshold for determining whether an alert should be presented to a user. However, it is important to note that a characteristic of the set of data items rather than the number of data items themselves may be compared to the warning threshold and critical threshold for determining whether an alert should be presented to a user. For example, an average value of the identified set of data items or an aggregated value of the identified set of data items rather than the number of data items themselves may be compared to a warning threshold and critical threshold for determining whether an alert should be presented to a user.

Once the watchlist item definition is created, it is stored at the server. The watchlist engine then evaluates the watchlist item definition to identify a set of data items to be monitored as well as whether the set of identified data items meet the criteria (e.g., critical threshold and warning threshold) for notifying the user to take action as shown at 305. The watchlist engine first utilizes the watchlist item definition to identify the set of data items that may need user action. In identifying the set of data items that may need user action, the watchlist engine may utilize the existing framework for the database. For example, the existing framework may allow for queries to be made on the database to identify the set of data items to be monitored. The watchlist engine may perform a query on the database based on the query parameters defined in the watchlist item definition to identify the set of data items that need to be monitored for user action. Alternatively, the watchlist engine may identify a saved or reusable query object for determining the set of data items that may need user action. For example, the watchlist item definition may include an identifier pointing to a saved/reuseable query object, which is then executed to identify the set of data items that need to be monitored for user action The watchlist engine may also periodically re-evaluate the watchlist item definition to again identify the set of data items that are to be monitored for user action, as the set of data items that may need to be monitored for user action may change over time. For example, the number of defective inventory items may increase over time as more inventory items become available. In some embodiments, the watchlist engine re-evaluates the watchlist item definition upon user request. In other embodiments, the watchlist engine re-evaluates the watchlist item definition at set intervals. It is important to note that the watchlist engine may be configured to re-evaluate the watchlist item definition at various times depending on the particular application.

Once the watchlist engine has evaluated the watchlist item definition to identify the set of data items that are to be monitored for user action, a watchlist item interface element may be presented to the user that corresponds to the watchlist item definition. The watchlist item interface element indicates the state of the identified set of data items to be monitored. The watchlist interface element indicates whether the identified set of data items to be monitored have met a set of criteria for presenting the user with an alert for taking user action. The watchlist engine compares the set of identified data items against the criteria defined by the watchlist item definition to determine if an alert recommending or requiring user action is needed as shown at 307. If the set of data items meets the criteria defined by the watchlist item definition, an alert recommending or requiring user action is provided to the user at the client device through the watchlist item interface element as shown at 309. If however, the set of data items does not meet the criteria, no alert is provided to the user at the client device and the method returns to step 305, where the watchlist engine again evaluates the watchlist item definition to identify the set of data items that may need user action.

In some embodiments, the watchlist engine provides the user with a first alert upon the set of data items meeting a first notification criterion and a second alert upon the set of data items meeting a second notification criterion. This is illustrated in FIG. 5.

Figure 5:
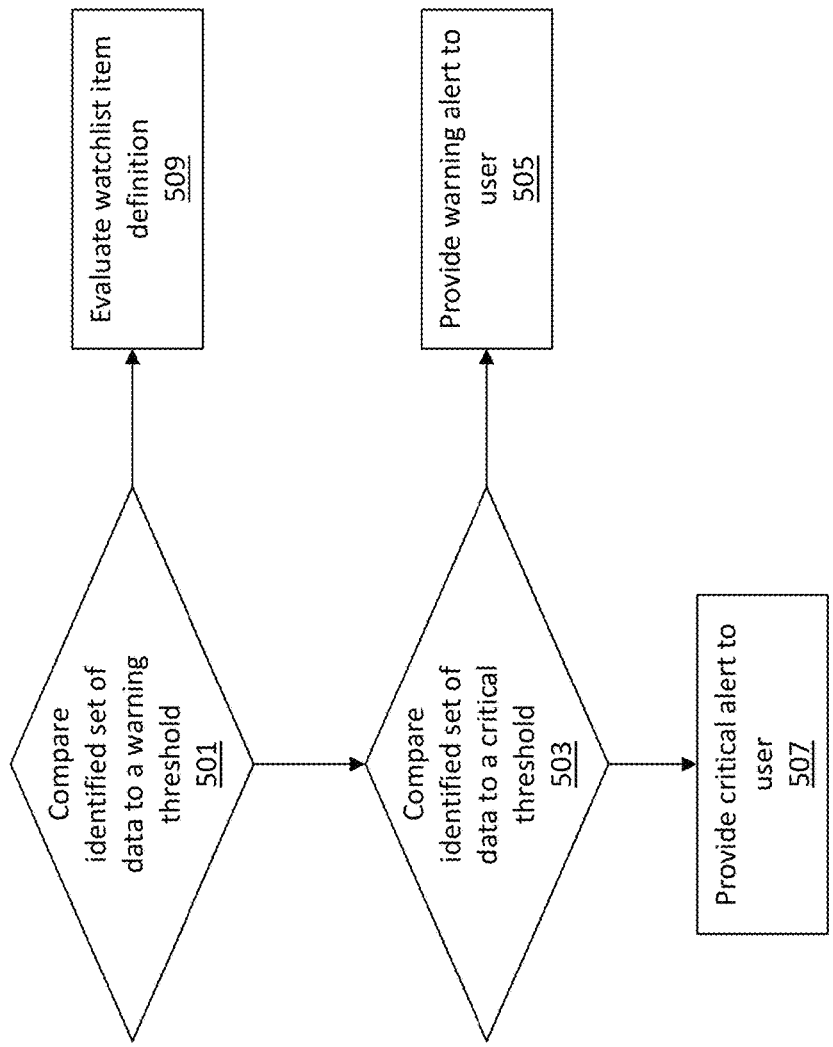
FIG. 5 is a flowchart illustrating a method for providing an alert recommending or requiring user performance of a user action to the user at the client device.

FIG. 5 is a flowchart illustrating a method for providing an alert recommending or requiring user performance of a user action to the user at the client device. Initially, the watchlist engine may compare the identified set of data to a warning threshold as shown at 501.

In some embodiments, the warning threshold may be low threshold such that if the identified set of data fails to meet or fall below the warning threshold, the watchlist engine again evaluates the watchlist item definition to identify a set of data items to be monitored as shown at 509. For example, where the set of defective inventory items fails to meet or fall below the warning threshold, the watchlist engine would re-evaluate the watchlist item definition to again identify a set of defective inventory items to be monitored. It is important to note that even though the watchlist engine is described as re-evaluating the watchlist item definition upon the identified set of data failing to meet the warning threshold, the watchlist engine may alternatively be configured to re-evaluate the watchlist item definition periodically (e.g., on a schedule) regardless of whether or not the warning criteria is met.

In other embodiments, the warning threshold may be a high threshold such that if the identified set of data fails to meet or exceed the warning threshold, the watchlist engine again evaluates the watchlist item definition to identify a set of data items to be monitored as shown at 509. For example, where the set of defective inventory items fails to meet or exceed the warning threshold, the watchlist engine would re-evaluate the watchlist item definition to again identify a set of defective inventory items.

In the situation where the warning threshold is a low threshold and the identified set of data items meets or falls below the warning threshold, the watchlist engine compares the identified set of data to a critical threshold as shown at 503. If the identified set of data meets or falls below the critical threshold, then a critical alert is provided to the user as shown at 507. For example, where the set of defective inventory items meets or falls below the critical threshold, the watchlist engine sends a critical alert to the user indicating that user action need to be taken immediately. If however, the identified set of data fails to meet or fall below the critical threshold, then a warning alert may be provided to the user as shown at 505. For example, where the set of inventory items having defects meets or falls below the warning threshold but not the critical threshold, the watchlist engine may send a warning alert to the user recommending that user action be taken.

In the situation where the warning threshold is a high threshold and the identified set of data items meets or exceeds the warning threshold, the watchlist engine compares the identified set of data to a critical threshold as shown at 503. If the identified set of data meets or exceeds the critical threshold, then a critical alert is provided to the user as shown at 507. For example, where the set of defective inventory items meets or exceeds the critical threshold, the watchlist engine sends a critical alert to the user indicating that user action need to be taken immediately. If however, the identified set of data fails to meet or exceed the critical threshold, then a warning alert may be provided to the user as shown at 505. For example, where the set of inventory items having defects meets or exceeds the warning threshold but not the critical threshold, the watchlist engine may send a warning alert to the user recommending that user action be taken.

Figure 6A:
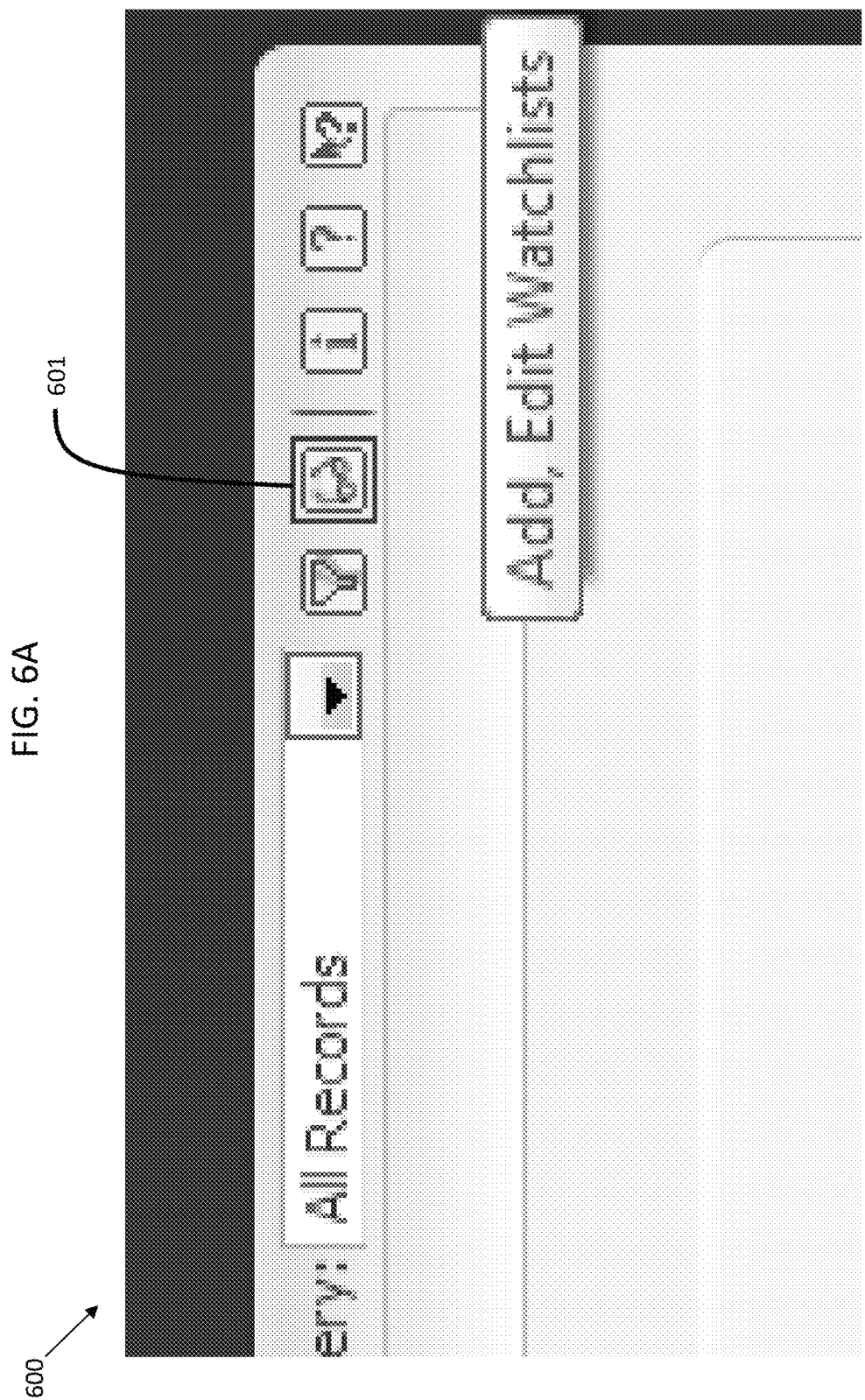
FIGS. 6A-C illustrate an example user interface for implementing and utilizing watchlist item definitions.
Figure 6B:
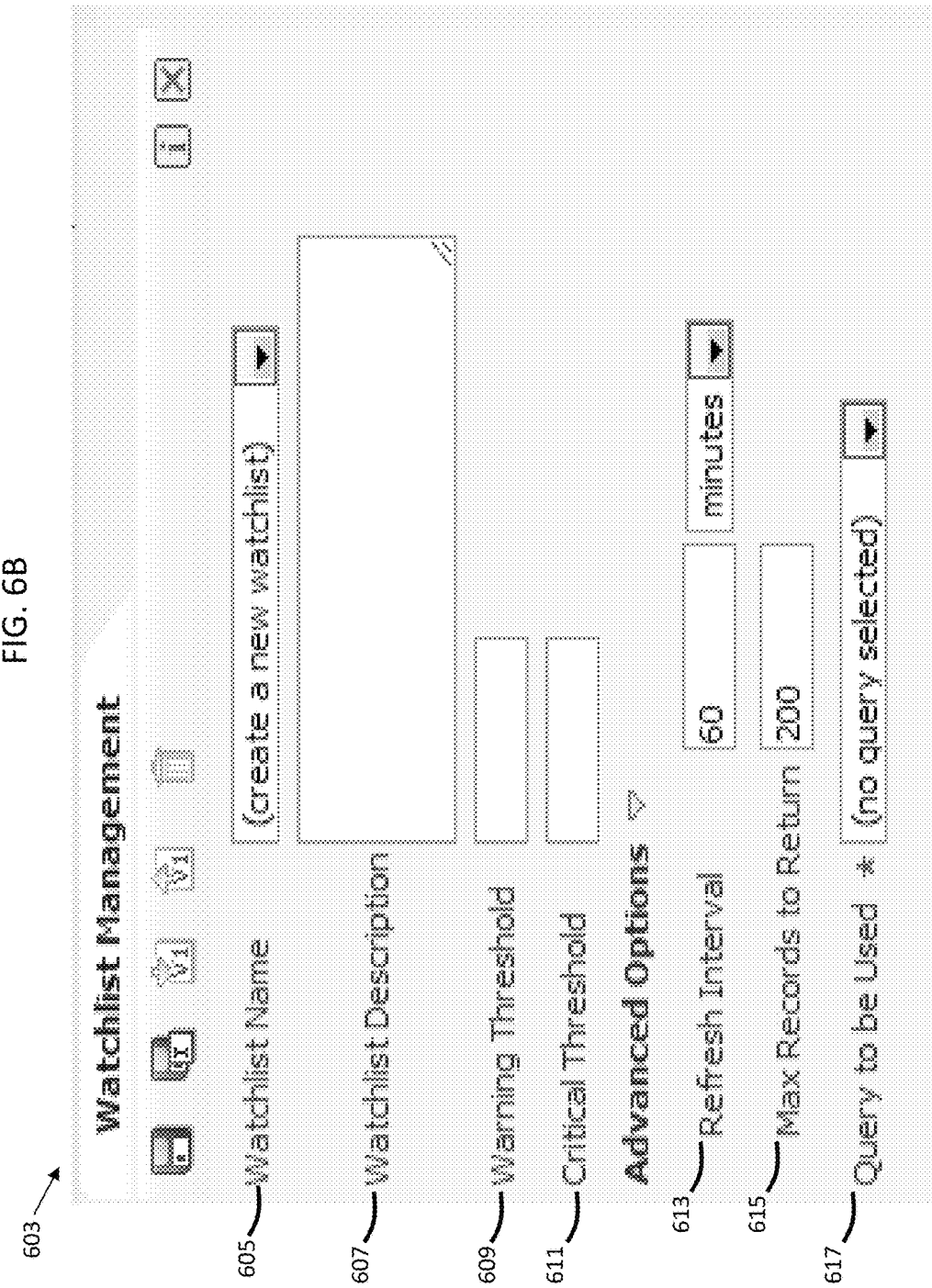
Figure 6C:
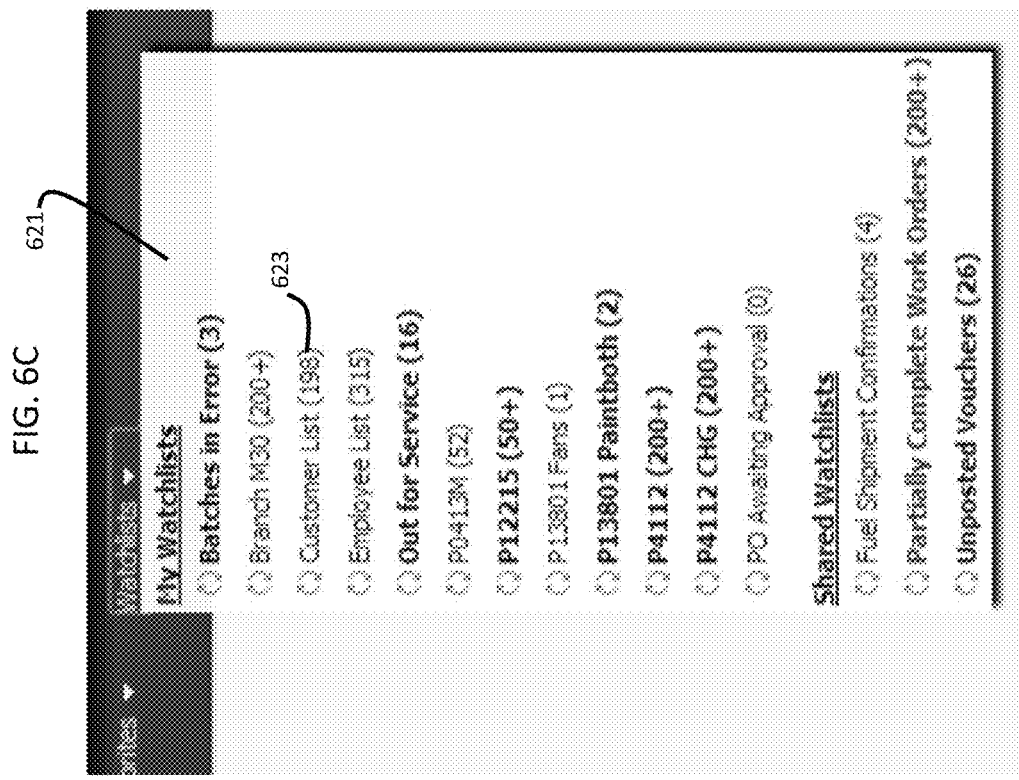

FIGS. 6A-C illustrate an example user interface for implementing and utilizing watchlist item definitions.

FIG. 6A illustrates an example user interface 600 for initiating a watchlist definition item. The user interface runs an application for interfacing with a database having a plurality of different data items. A watchlist creation icon 601 may be available in the user interface for allowing the user to create a watchlist item definition to be used in accordance with the methods and systems described above, as illustrated in FIG. 6A. The user may click the watchlist creation icon 601 to create a new watchlist item definition to be utilized by a watchlist engine for proactively presenting the user with an indication of a collection of data items that may require user action by the user as well as alerts indicating when user actions should or need to be taken.

FIG. 6B illustrates an example user interface 603 for creating a watchlist definition item. Once the user has selected the watchlist creation icon 601 from FIG. 6A, the user is provided with a user interface 603 for configuring parameters of the watchlist item definition. An example interface 603 for configuring parameters of the watchlist item definition is illustrated in FIG. 6B. The interface in FIG. 6B may have a plurality of watchlist item definition fields to be configured by the user.

The watchlist item definition fields may include a Watchlist Name field 605, a Watchlist Description field 607, a Warning Threshold field 609, a Critical Threshold field 611, a Refresh Interval field 613, a Max Records to Return field 615, and a Query to be Used field 617.

The Watchlist Name Field 605 is used to name the given watchlist item corresponding to the watchlist item definition, which is later displayed to the user. The Watchlist Description 607 is an optional field that allows the user to provide additional description of what the watchlist item definition represents.

The Warning Threshold 609 is a criterion that may be defined by the user for comparing the identified set of data items to. As described above, if the set of identified data items meets the warning threshold, a warning alert may be provided to the user. Similarly, the Critical Threshold 611 is another criterion that may be defined by the user for comparing the identified set of data items to. As described above, if the set of identified data items meets the critical threshold, a critical alert may be provided to the user.

The Refresh Interval 613 is an optional field that may be defined by the user for determining when to re-evaluate a watch list item definition to identify a set of data items that may require user action.

The Max Records to Return field 615 is an optional field that may be defined by the user for setting a limit as to the size of the set of data items that are identified to be monitored for user action.

The Query to be Used field 617 may define the parameters for identifying the set of items to be monitored for user action or alternatively may identify a saved/reusable query object to be executed for identifying the set of data items to be monitored. In some embodiments, the user may define a set of query parameters in the Query to be Used field 617 that may be used to filter the database to identify the set of items to be monitored for user action. Alternatively, the user may identify a saved or reusable query object in the Query to be Used field 617 for determining the set of data items that may need user action. For example, the Query to be User field 617 may include an identifier pointing to a saved/reuseable query object, which is then executed to identify the set of data items that need to be monitored for user action.

Once the watchlist definition has been defined by the user, it is used by a watchlist engine in accordance with the methods described above. FIG. 6C illustrates an example user interface 619 used to proactively present the user with a collection of data items that may require user action by the user as well as alerts indicating when user actions should or need to be taken. The user interface includes a watchlist interface element 621, which describes a set of one or more watchlist items. The watchlist items 623 are interface elements presented to the user that correspond to a set of data items to be monitored for user action as well as an alert indicating when user actions should or need to be taken. As described above, each watchlist item 623 is associated with a watchlist item definition that is utilized to proactively present the user with an indication of a set of identified data items that may require user action by the user as well as alerts indicating when user actions should or need to be taken.

In the user interface 619 of FIG. 6C, each watchlist item 623 is identified by name (e.g., Batches in Error) and also includes an indication of the set of data items (e.g., 3) identified for that watchlist item 623. Additionally, each watchlist item 623 may also include an alert indicating when user actions should or need to be taken. For example, a warning alert indicating that user action should be taken for a set of data items identified for a watchlist item may be provided by presenting the watchlist item 623 in a bold grey font (e.g., Partially Complete Work Orders). Alternatively, a critical alert indicating that user action need to be taken for a set of data items identified for a watchlist item may be provided by presenting the watchlist item 623 in a bold black font (e.g., Batches in Error).

Techniques for defining and configuring alerts are further described in U.S. patent application Ser. No. 14/188,341, entitled "PROJECT MANAGEMENT ALERTS USING HETEROGENEOUS PROJECT DATA", filed on Feb. 24, 2014, which is hereby incorporated by reference in its entirety.

The user interface 619 of FIG. 6C may be utilized in any number of ways. The watchlist item definitions corresponding to the watchlist items in the watchlist interface element may be evaluated upon selection by the user. The watchlist item definitions may be evaluated one at a time or several at a time. Watchlist items with watchlist item definitions that are actively being evaluated may have an animated (in-progress) icon and watchlist items with watchlist item definitions that are pending evaluation may have a clock (waiting icon).

In some embodiments, a watchlist item definition corresponding to a watchlist item is not subsequently evaluated until the user again selects the corresponding watchlist item. In some embodiments, when a watchlist item is subsequently selected, its previous indication of data items that may require user action by the user as well as its previous alert indicating when user actions should or need to be taken is displayed until re-evaluation of the corresponding watchlist item definition is completed.

In some embodiments, the determination as to whether a watchlist item definition corresponding to a watchlist item is to be re-evaluated is based on the length of time since the watchlist item definition was last evaluated. In some embodiments, a default time for when a watchlist item definition is to be re-evaluated is set. In other embodiments, the user may define a time for when a watchlist item definition is to be re-evaluated. In other embodiments, a system administrator may define a time for when a watchlist item definition is to be re-evaluated, which may override the user's re-evaluation period. For example, a user may define his watchlist item such that it is to be re-evaluated every second, but a system administrator may impose a restriction that the refresh interval must be at least 5 minutes in order to avoid overloading the system.

By utilizing a watchlist item definition and watchlist engine, the user is no longer required to actively identify data items that may require user action and then determine whether those user actions should be performed. Instead the watchlist engine utilizes the watchlist item definitions in accordance with the methods described above to proactively present the user with an indication of a set of data items that may require user action by the user as well as alerts indicating when user actions should or need to be taken.

Additionally, when a watchlist item identifying a set of data items that may require user action is presented to the user, by simply clicking on the watchlist item, the user may be directly taken to a screen that presents that set of data items, such that the user may more efficiently perform the necessary corrective actions on the set of data items.

As mentioned above a given user may have several different watchlist items, either created by the user or shared with the user. FIG. 7 is a flow diagram illustrating a method for evaluating watchlist items for a user according to some embodiments of the invention. Initially, a set of watchlist items that are associated with the user are identified as shown at 701. The set of watchlist items may include both watchlist items created by the user or shared with the user.

After the watchlist items have been identified, the corresponding watchlist item definitions for each of the identified watchlist items are located as shown at 703. The watchlist item definitions for each of the identified watchlist items are then scheduled for evaluation as shown at 705. In some embodiments, different watchlist item definitions may have different priorities, and so the scheduler may schedule evaluation of watchlist item definitions based on priority.

System Architecture Overview

Figure 8:
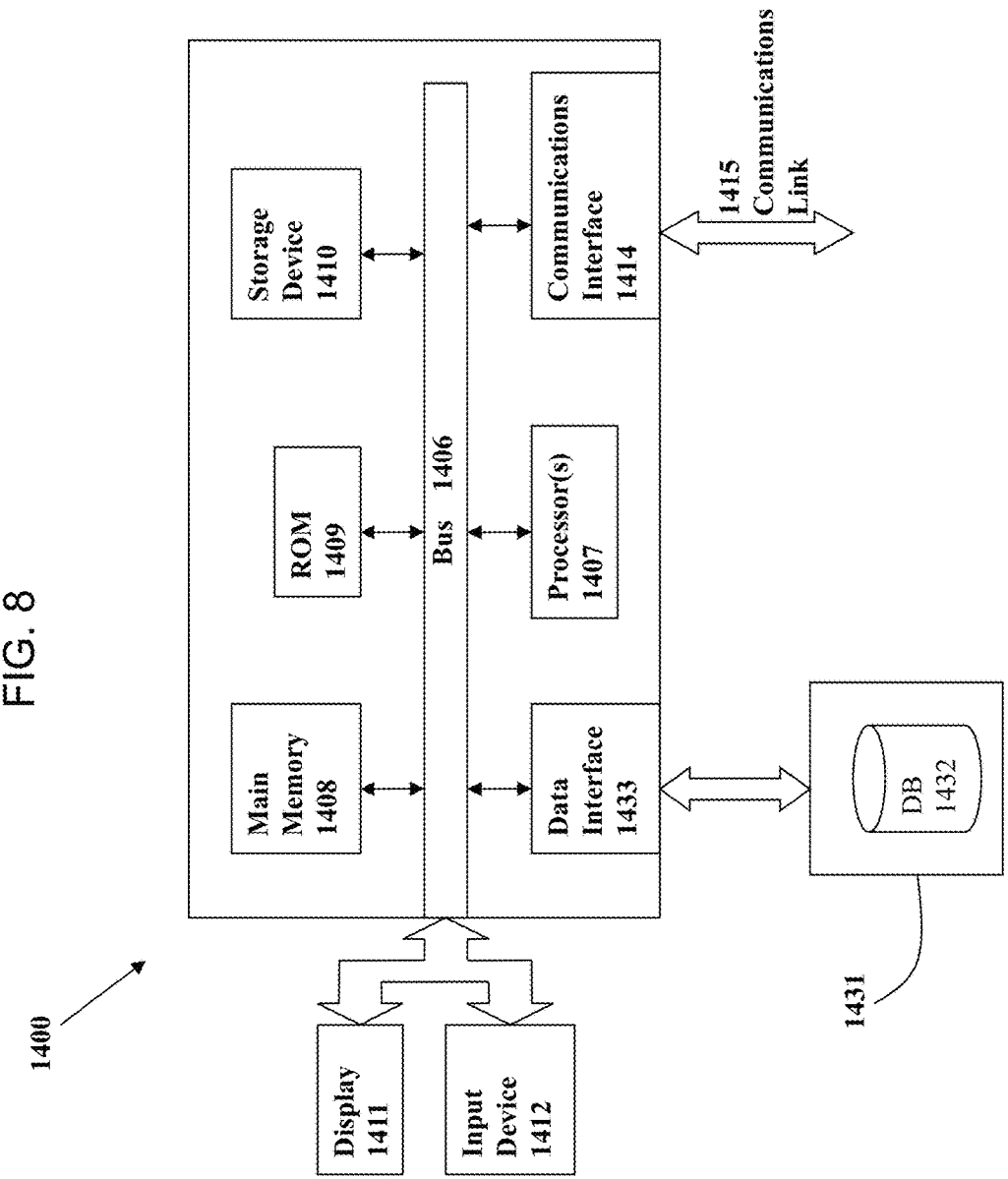
FIG. 8 is a block diagram of an illustrative computing system suitable for implementing an embodiment of the present invention.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Although particular embodiments have been shown and described, it will be understood that they are not intended to limit the claimed invention, and it will be made obvious to those skilled in the art that various changes and modifications may be made without departing from the spirit and scope of the claimed invention. The specification and drawings are, accordingly, to be regarded in an illustrative rather than restrictive sense. The claimed invention is intended to cover alternatives, modifications, and equivalents.

What is claimed is:

1. A method for monitoring one or more data items in a database, comprising:

using at least one processor that is programmed or configured for performing a process, the process comprising:

determining a set of parameters for identifying at least one data item amongst the one or more data items in the database;

determining criteria for recommending or requiring user action for the at least one data item to be identified;

creating a watchlist item definition for evaluating the one or more data items in the database, wherein the watchlist item definition defines at least the determined set of parameters for identifying the at least one data item amongst the one or more data items in the database and the determined criteria for recommending or requiring user action for the at least one data item to be identified, wherein at least one parameter of the determined set of parameters defines an interval at which the data items in the database is to be evaluated;

evaluating the watchlist item definition at the defined interval to identify the at least one data item, wherein the evaluation comprises comparing the one or more data items in the database against the defined set of parameters in the watchlist item definition;

presenting an indication of the identified at least one data item; and providing an alert recommending or requiring user action when the identified at least one data item meets the criteria for recommending or requiring user action defined in the watchlist item definition, wherein the alert is a warning alert when the identified at least one data item meets a warning threshold, and wherein the alert is a critical alert when the identified at least one data item meets the warning threshold and a critical threshold.

2. The method of claim 1, wherein identifying the at least one data item comprises utilizing an existing framework for a database having the at least one data item.

3. The method of claim 2, wherein identifying the at least one data item involves performing logical operations on the database.

4. The method of claim 2, wherein utilizing the existing framework comprises performing a query.

5. The method of claim 1, further comprising re-evaluating the watchlist item definition.

6. The method of claim 5, wherein the watchlist item definition is re-evaluated upon user request.

7. The method of claim 5, wherein the watchlist item definition is re-evaluated periodically.

8. The method of claim 1, wherein the indication of the identified at least one data item and the alert recommending or requiring user action are provided to a user without requiring the user to perform an active step.

9. The method of claim 1, wherein selecting the indication of the identified a least one data item allows the user to be presented with identified at least one data item.

10. A non-transitory computer program product embodied on a computer readable medium, the non-transitory computer readable medium having stored thereon a sequence of instructions which, when executed by a processor causes the processor to execute a method for monitoring data items in a database comprising:

determining a set of parameters for identifying at least one data item amongst the one or more data items in the database;

determining criteria for recommending or requiring user action for the at least one data item to be identified;

creating a watchlist item definition for evaluating the one or more data items in the database, wherein the watchlist item definition defines at least the determined set of parameters for identifying the at least one data item amongst the one or more data items in the database and the determined criteria for recommending or requiring user action for the at least one data item to be identified, wherein at least one parameter of the determined set of parameters defines an interval at which the data items in the database is to be evaluated;

evaluating the watchlist item definition at the defined interval to identify the at least one data item, wherein the evaluation comprises comparing the one or more data items in the database against the defined set of parameters in the watchlist item definition;

presenting an indication of the identified at least one data item; and providing an alert recommending or requiring user action when the identified at least one data item meets the criteria for recommending or requiring user action defined in the watchlist item definition, wherein the alert is a warning alert when the identified at least one data item meets a warning threshold, and wherein the alert is a critical alert when the identified at least one data item meets the warning threshold and a critical threshold.

11. The computer program product of claim 10, wherein identifying the at least one data item comprises utilizing an existing framework for a database having the at least one data item.

12. The computer program product of claim 11, wherein identifying the at least one data item involves performing logical operations on the database.

13. The computer program product of claim 11, wherein utilizing the existing framework comprises performing a query.

14. The computer program product of claim 10, further comprising re-evaluating the watchlist item definition.

15. The computer program product of claim 14, wherein the watchlist item definition is re-evaluated upon user request.

16. The computer program product of claim 14, wherein the watchlist item definition is re-evaluated periodically.

17. The computer program product of claim 10, wherein the indication of the identified at least one data item and the alert recommending or requiring user action are provided to a user without requiring the user to perform an active step.

18. The computer program product of claim 10, wherein selecting the indication of the identified at least one data item allows the user to be presented with the set of data items for user action.

19. A system for monitoring data items in a database, comprising:

a processor;

a memory comprising computer code executed using the processor, in which the computer code implements a process for:

determining a set of parameters for identifying at least one data item amongst the one or more data items in the database;

determining criteria for recommending or requiring user action for the at least one data item to be identified;

creating a watchlist item definition for evaluating the one or more data items in the database, wherein the watchlist item definition defines at least the determined set of parameters for identifying the at least one data item amongst the one or more data items in the database and the determined criteria for recommending or requiring user action for the at least one data item to be identified, wherein at least one parameter of the determined set of parameters defines an interval at which the data items in the database is to be evaluated;

evaluating the watchlist item definition at the defined interval to identify the at least one data item, wherein the evaluation comprises comparing the one or more data items in the database against the defined set of parameters in the watchlist item definition;

presenting an indication of the identified at least one data item; and providing an alert recommending or requiring user action when the identified at least one data item meets the criteria for recommending or requiring user action defined in the watchlist item definition, wherein the alert is a warning alert when the identified at least one data item meets a warning threshold, and wherein the alert is a critical alert when the identified at least one data item meets the warning threshold and a critical threshold.

20. The system of claim 19, wherein identifying the at least one data item comprises utilizing an existing framework for a database having the at least one data item.

21. The system of claim 20, wherein identifying the at least one data item involves performing logical operations on the database.

22. The system of claim 20, wherein utilizing the existing framework comprises performing a query.

23. The system of claim 19, further comprising re-evaluating the watchlist item definition.

24. The system of claim 23, wherein the watchlist item definition is re-evaluated upon user request.

25. The system of claim 23, wherein the watchlist item definition is re-evaluated periodically.

26. The system of claim 19, wherein the indication of the identified at least one data item and the alert recommending or requiring user action are provided to a user without requiring the user to perform an active step.

27. The system of claim 19, wherein selecting the indication of the identified at least one data item allows the user to be presented with the set of data items for user action.

* * * * *

UNITED STATES PATENT AND TRADEMARK OFFICE
CERTIFICATE OF CORRECTION

PATENT NO. : 10,454,947 B2
APPLICATION NO. : 14/247810
DATED : October 22, 2019
INVENTOR(S) : Rodgers et al.

Page 1 of 1

It is certified that error appears in the above-identified patent and that said Letters Patent is hereby corrected as shown below:

In the Specification

In Column 1, Line 14, delete "HETEROGENOEOUS" and insert -- HETEROGENEOUS --, therefor.

In Column 7, Line 35, delete "action" and insert -- action. --, therefor.

In the Claims

In Column 13, Line 38, in Claim 9, delete "a least" and insert -- at least --, therefor.

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*